(12) United States Patent
Iotti

(10) Patent No.: US 12,534,350 B2
(45) Date of Patent: Jan. 27, 2026

(54) TELEHANDLER WITH FACILITATED ASCENT AND DESCENT

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 441 days.

(21) Appl. No.: 17/711,578

(22) Filed: Apr. 1, 2022

(65) Prior Publication Data

US 2022/0315402 A1  Oct. 6, 2022

(30) Foreign Application Priority Data

Apr. 6, 2021  (IT) .................. 102021000008540

(51) Int. Cl.
*B60N 3/02* (2006.01)
*B66F 9/075* (2006.01)

(52) U.S. Cl.
CPC .............. *B66F 9/0759* (2013.01); *B60N 3/02* (2013.01)

(58) Field of Classification Search
CPC ...... B66F 9/0759; B62D 33/0613; E02F 9/16; E02F 9/163; B60N 3/02
USPC ................. 296/1.02, 190.01, 190.08, 190.11
See application file for complete search history.

(56) References Cited

U.S. PATENT DOCUMENTS

| 4,023,827 | A | * | 5/1977 | Matalonis | B60N 2/24 |
| | | | | | 280/756 |
| 4,072,339 | A | * | 2/1978 | Rothlisberger | B60N 3/02 |
| | | | | | 280/181 |
| 4,266,318 | A | * | 5/1981 | Dauwalder | B60N 3/02 |
| | | | | | 403/2 |
| 6,325,449 | B1 | * | 12/2001 | Sorensen | B62D 33/0617 |
| | | | | | 296/190.08 |
| D669,414 | S | * | 10/2012 | Budde | D12/404 |
| 11,660,941 | B2 | * | 5/2023 | Kato | B60J 5/0487 |
| | | | | | 296/190.11 |
| 11,685,238 | B2 | * | 6/2023 | Erhardt | B60J 5/02 |
| | | | | | 296/190.11 |
| 11,772,537 | B2 | * | 10/2023 | Purushothama | B60N 3/023 |
| | | | | | 296/1.02 |

(Continued)

FOREIGN PATENT DOCUMENTS

EP  3640403 A1  4/2020
EP  3719214 A1  10/2020

(Continued)

OTHER PUBLICATIONS

Office Action with English translation from Russian Patent Application No. 2022107839/03(016329), dated Jul. 25, 2024, 9 pages.

(Continued)

*Primary Examiner* — Gregory A Blankenship
(74) *Attorney, Agent, or Firm* — Chrisman Gallo Tochtrop LLC

(57) ABSTRACT

Described is a telehandler equipped with a carriage movable on wheels and a driver's cab (1), located above the carriage, which comprises an access door (10) equipped with two side jambs (11, 12), to each of which is fixed a continuous handle (2, 3) the length of which is greater than half the length of the respective jamb (11, 12).

11 Claims, 1 Drawing Sheet

(56) References Cited

U.S. PATENT DOCUMENTS

| | | | |
|---|---|---|---|
| 11,773,566 B2* | 10/2023 | Kato | E02F 9/163 296/190.11 |
| 11,951,815 B2 | 4/2024 | Kato | |
| 2005/0280286 A1* | 12/2005 | Kelley | E02F 9/163 296/190.08 |
| 2007/0273178 A1 | 11/2007 | Kelley et al. | |
| 2008/0007090 A1* | 1/2008 | Ayabe | B60R 21/11 296/190.08 |
| 2009/0322052 A1 | 12/2009 | Ruehl | |
| 2011/0233963 A1* | 9/2011 | Yamashita | B62D 33/0617 296/190.11 |
| 2017/0233015 A1* | 8/2017 | Knutson | E02F 9/2004 296/190.05 |
| 2019/0039868 A1* | 2/2019 | Puszkiewicz | B66F 9/0755 |
| 2019/0071291 A1* | 3/2019 | Puszkiewicz | B66F 9/075 |
| 2022/0073328 A1* | 3/2022 | Iotti | B66F 9/07504 |
| 2022/0315402 A1* | 10/2022 | Iotti | B60N 3/02 |

FOREIGN PATENT DOCUMENTS

| | | | |
|---|---|---|---|
| JP | 2021042601 A | 3/2021 | |
| RU | 2122497 C1 | 11/1998 | |
| RU | 146190 U1 | 10/2014 | |
| RU | 2699094 C2 | 9/2019 | |

OTHER PUBLICATIONS

Search Report with English translation from Russian Patent Application No. 2022107839/03(016329), Date of actual completion of the search: Jul. 23, 2024, accompanying Office action dated Jul. 25, 2024, 4 pages.

* cited by examiner

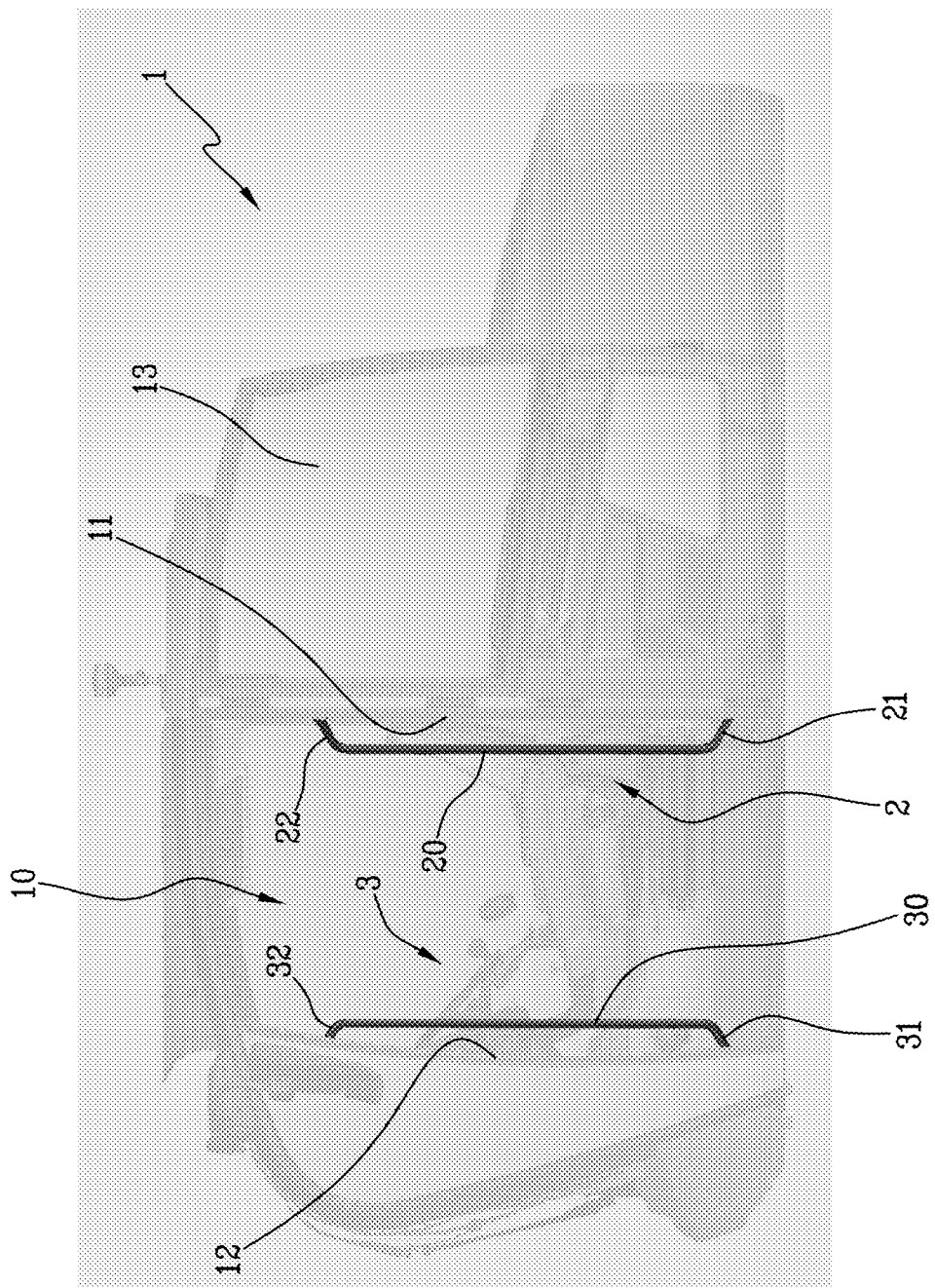

TELEHANDLER WITH FACILITATED ASCENT AND DESCENT

This invention relates to a telehandler equipped with a cab with facilitated ascent and descent.

In detail, the invention relates to a cab for telehandlers provided with better aid means for the ascent and descent of the operator.

There are prior art telehandlers consisting of a vehicle equipped with a carriage movable on wheels, a driver's cab and an operating arm which can be extended telescopically which are mounted directly on the carriage or on a rotary tower mounted on the carriage.

In the outer side opposite to the side adjacent to the arm, that is to say, usually the left side, the cab has the access door and the closing and opening door; beneath the cab and substantially aligned with the opening and closing door there is the ladder used by the operator to ascend into the cab or descend from the telehandler.

Ascending up to and descending from the driving position is a notoriously is risky operation, both because the cabin is often at a significant height above the ground and because, especially during the descent, the operator cannot see where to rest his/her feet and must therefore feel his/her way.

In addition, the environment in which these machines work, such as building sites or agricultural fields, inevitably leads to their soiling with soil or sand, as well as making them subject to weather conditions such as rain and snow, with the consequence that the surfaces of the ladder and of the cab can become slippery.

For these reasons, it is not unlikely that, during the ascent or descent, the operator loses balance and falls to the ground.

In order to help the operator to climb up to and descend from the driving position, the telehandlers are provided with various handles distributed at various points of the cab, at different heights, in particular at the jambs of the access door and in the inner side of the door.

However, this solution is not free of drawbacks, since it may happen that the operator whilst ascending or descending, when moving a hand from an upper handle to a lower handle or vice versa, loses grip, with the risk of losing balance.

The technical purpose which forms the basis of the invention is therefore to provide a telehandler provided with a solution for aiding the ascending and descending which is able to overcome the limits of the prior art.

The technical purpose is achieved by the telehandler made according to the accompanying claims.

Further characteristics and advantages of the invention will become more apparent in the non-limiting description of a preferred but non-exclusive embodiment of the cab of the proposed telehandler, as illustrated in the accompanying drawings, in which FIG. 1 is a side view of the cab of the telehandler according to the invention.

In the accompanying drawings, the numeral 1 denotes a cab included in a telehandler according to the invention.

The invention is designed for use with a telehandler of the fixed or rotary type, the latter being provided with a rotary platform, which has the cab 1 and the operating arm and is mounted on a carriage provided with wheels. As shown in FIG. 1, the proposed cab 1 has an access door 10, provided with two side jambs 11, 12, at one of which is hinged the door 13 which opens or closes the access door 10.

Advantageously, each jamb 11, 12 has fixed to it a continuous handle 2, 3 the length of which is greater than half the length of the jamb itself.

In practice, each handle 2, 3 comprises a central gripping portion 20, 30 which is continuous and substantially parallel to the respective jamb 11, 12; the handle 2, 3 includes two opposite end portions 21, 22, 31, 32, oblique or transversal to the central portion 20, 30, which are joined to the respective jamb 11, 12, by bolts or welding or other means which are suitable for the purpose.

Preferably, each handle is formed by a single continuous bar 2, 3 and, in this case, the above-mentioned gripping portion consists of the linear segment 20, 30, which may be, for example, rectilinear, as shown in the drawings.

The gripping segment 20, 30 of both the handles 2, 3 is more than half the length of the respective jamb 11, 12 and, preferably, has a length greater than or equal to 60% of the length of the jamb 11, 12.

The gripping segment 20, 30 is preferably positioned vertically, regardless of the shape of the jambs 11, 12.

As can be seen in the accompanying drawing, the two handles 2, 3 may be substantially symmetrical relative to a vertical plane which passes through the access door 10 and, preferably, the two handles 2, 3 are the same.

According to the example embodiment illustrated in the drawing, both the handles 2, 3 protrude towards the inside of the cab 1; in practice, they are inclined relative to the jambs 11, 12 in such a way as to be contained in the cab 1.

Thanks to the fact that the invention provides an access door 10 of the cab 1 provided with two long continuous handles 2, 3, the proposed telehandler overcomes the limitations of the prior art.

In fact, for example, during the descending step, the operator has his/her shoulders facing towards the outside of the cab 1 and grips the handles 2, 3.

As his/her feet descend down the ladder described in the introduction, instead of completely detaching the hands from the handles 2, 3 each time he/she needs to guarantee a lower grip, as was the case with the prior art, the operator loosens the grip and slides with the hand along the handle 2, 3 down to the most suitable height for the subsequent gripping.

The same procedure is applied, inverted, for the ascending step.

In this way, the possibility that the operator completely misses the grip is reduced if not annulled whilst climbing into the cab 1 or whilst descending from it, thereby avoiding dangerous losses of balance.

The invention claimed is:

1. A telehandler equipped with a carriage movable on wheels and a driver's cab (1), located above the carriage, which comprises an access door (10) equipped with two side jambs (11, 12), each side jamb consists of a single continuous handle (2, 3) a length of which is greater than half that of the respective jamb (11, 12), wherein the two handles (2, 3) protrude inside the cab (1).

2. The telehandler according to claim 1, wherein each handle (2, 3) comprises a continuous central gripping portion (20, 30) having a length greater than half that of the respective jamb (11, 12).

3. The telehandler according to claim 1, wherein said gripping portion (20, 30) is positioned vertically.

4. The telehandler according to claim 1, wherein the gripping portion (20, 30) is substantially parallel to the respective jamb (11, 12).

5. The telehandler according to claim 1, wherein the two handles (2, 3) are substantially symmetrical relative to a vertical plane which passes through the access door (10).

6. The telehandler according to claim 1, wherein lengths of the two handles (2, 3) are equal.

7. The telehandler according to claim 1, wherein one of the two side jambs (11, 12) of the access door (10) is hinged.

8. The telehandler according to claim 7, wherein the one of the two side jambs (11, 12) that is hinged allows the access door (10) to open and close.

9. The telehandler according to claim 1, wherein each handle (2, 3) protrudes towards the inside of the driver's cab (1) and is inclined relative to the two side jambs (11, 12) of the access door (10).

10. The telehandler according to claim 1, wherein each handle (2, 3) has a length of which is greater than 60% that of the respective jamb (11, 12).

11. A telehandler equipped with a carriage movable on wheels and a driver's cab (1), located above the carriage, the driver's cab has an access door (10) equipped with two side jambs (11, 12), each side jamb consists of a single continuous handle (2, 3) formed by a single bar and fixed to the side jamb, each single continuous handle has a continuous central gripping portion (20, 30) having a length greater than 60% of that of the respective jamb and two opposite end portions oblique to the central gripping portion joined the side jamb, wherein each single continuous handle protrudes towards the inside of the driver's cab (1) and is inclined relative to the two side jambs (11, 12) of the access door (10).

\* \* \* \* \*